UNITED STATES PATENT OFFICE.

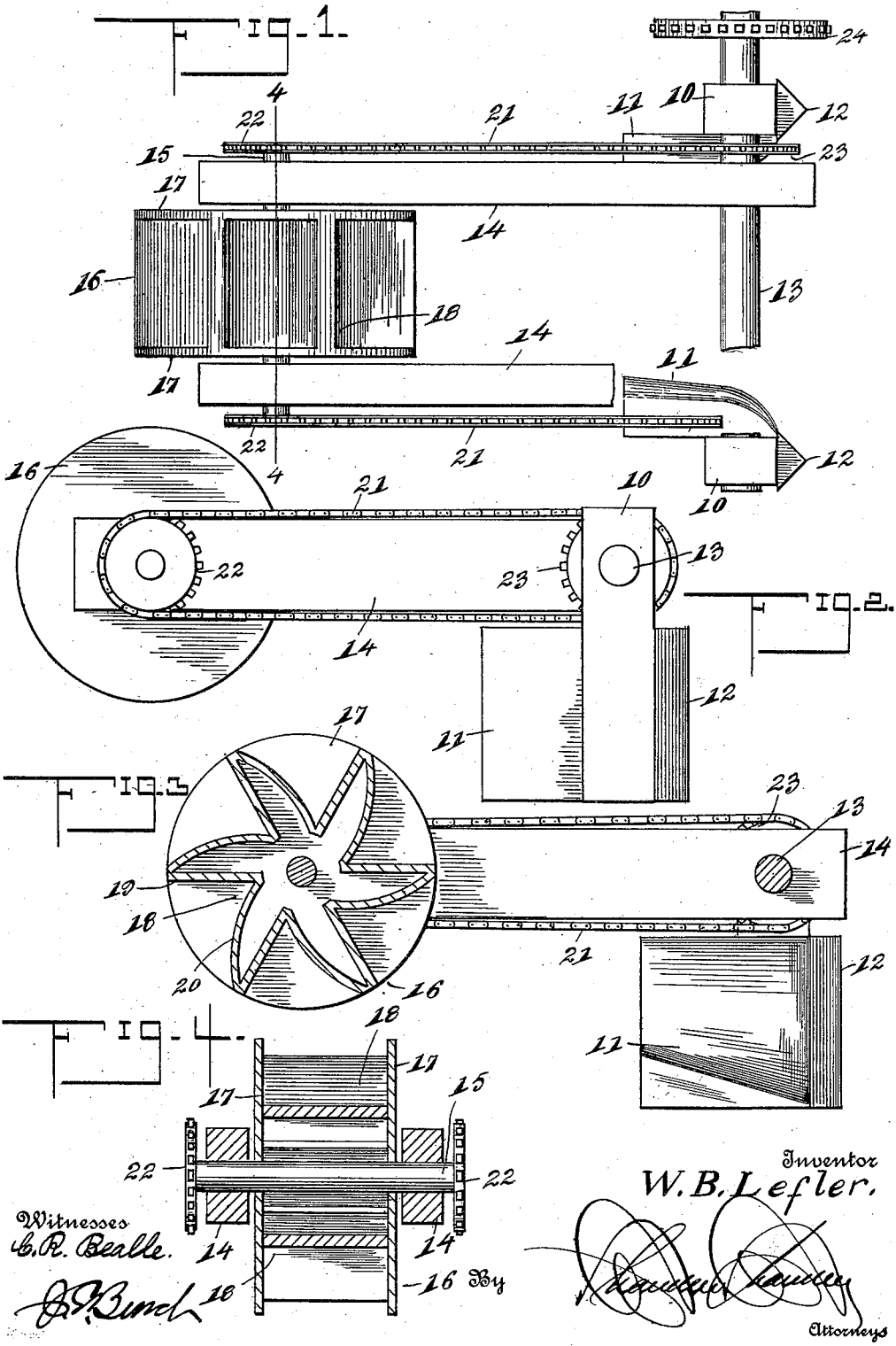

WILLIAM B. LEFLER, OF SPRINGFIELD, NEBRASKA.

WATER-POWER WHEEL.

1,082,883.  Specification of Letters Patent.  Patented Dec. 30, 1913.

Application filed October 21, 1912. Serial No. 727,056.

*To all whom it may concern:*

Be it known that I, WILLIAM B. LEFLER, a citizen of the United States, residing at Springfield, in the county of Sarpy, State of Nebraska, have invented certain new and useful Improvements in Water - Power Wheels; and I do hereby declare the following to be a full, clear, and exact description of the invention, such as will enable others skilled in the art to which it appertains to make and use the same.

This invention has special reference to water motors or power wheels, the device being designed to operate by the motion of the waves or current of a stream.

Another object of the invention is to provide an improved water motor involving a floating power wheel pivotally supported for movement up and down with the waves and high or low tide so as to permit the passage also, of floating ice, logs and the like while novel supporting means are provided for the wheel whereby power may be derived upon rotation of the wheel.

With the above and other objects in view, the invention resides more particularly in the peculiar combination and arrangements of parts as will be partly illustrated as a preferred embodiment in the accompanying drawings and described in the specification, although the invention is protected from all desirable changes and uses within the scope of the invention as claimed.

Figure 1 is a top plan view of the improved water power motor or wheel. Fig. 2 is a side elevation thereof. Fig. 3 is a longitudinal sectional view taken through the wheel. Fig. 4 is a cross sectional view taken on the line 4—4 of Fig. 1.

As illustrated, embedded vertical supports or piers 10 are provided in spaced relation in a river bed or stream to project above the same, upwardly curved and converging channel walls 11 being secured or arranged inwardly of the piers and providing or constituting a channel-way, to guide the water therethrough into forceful contact with the power wheel. This channel is substantially tapered and upwardly inclined in the direction of the wheel, and the resistance offered thereby against the current or tide is reduced by means of substantially triangular or pointed shields 12 arranged forwardly of the piers.

A power shaft 13 is rotatably supported through the piers and pivotally carries a pair of arms 14 spaced apart while the free ends of the arms carry a drum or wheel shaft 15. The drum or water wheel 16 mounted on the shaft is provided with a central inclosed portion serving to float the wheel, while side plates or flanges 17 are provided to preferably close a series of pockets 18 arranged to catch the water as the same flows under the wheel whereby the same will be rotated.

The pockets 18 are preferably formed with walls 19 located radially with respect to the wheel and walls 20 located spirally with respect to the wheel, the first named walls serving to catch the water and the last named walls serving to reduce the resistance during the passage of the pockets into positions for catching the water.

Endless drive chains or belts 21 are engaged around sprocket wheels or pulleys 22 secured rigidly to the extremities of the drum shaft outwardly of the arms and around sprocket wheels or pulleys 23 secured to the power shaft for rotating the latter, from which power may be derived through a sprocket wheel or pulley 24 keyed to one extremity thereof.

It will thus be seen that with the wheel pivotally supported to move vertically with the current and tide, injury to the wheel will be prevented and power may be derived therefrom at all times. The formation of the channel between which the water is directed, also serves to direct the water toward the wheel for deriving the greatest amount of power.

I claim:

The combination with spaced supporting piers mounted in a body of flowing water and convergent channels arranged inwardly thereof to direct the water between the same; of a shaft rotatably supported from the piers, arms pivotally carried thereby, a water wheel rotatably carried at the free ends of the arms, said water wheel embodying a closed drum having peripheral pockets to catch the water, the drums serving to float the wheel and permit the passage of floating objects therebeneath, drive connections between the wheel and the shaft and means for deriving power from the shaft.

In testimony whereof, I affix my signature, in the presence of two witnesses.

WILLIAM B. LEFLER.

Witnesses:
 E. N. CHRISTIANSON,
 L. A. STACY.

Copies of this patent may be obtained for five cents each, by addressing the "Commissioner of Patents, Washington, D. C."